Figure 1:
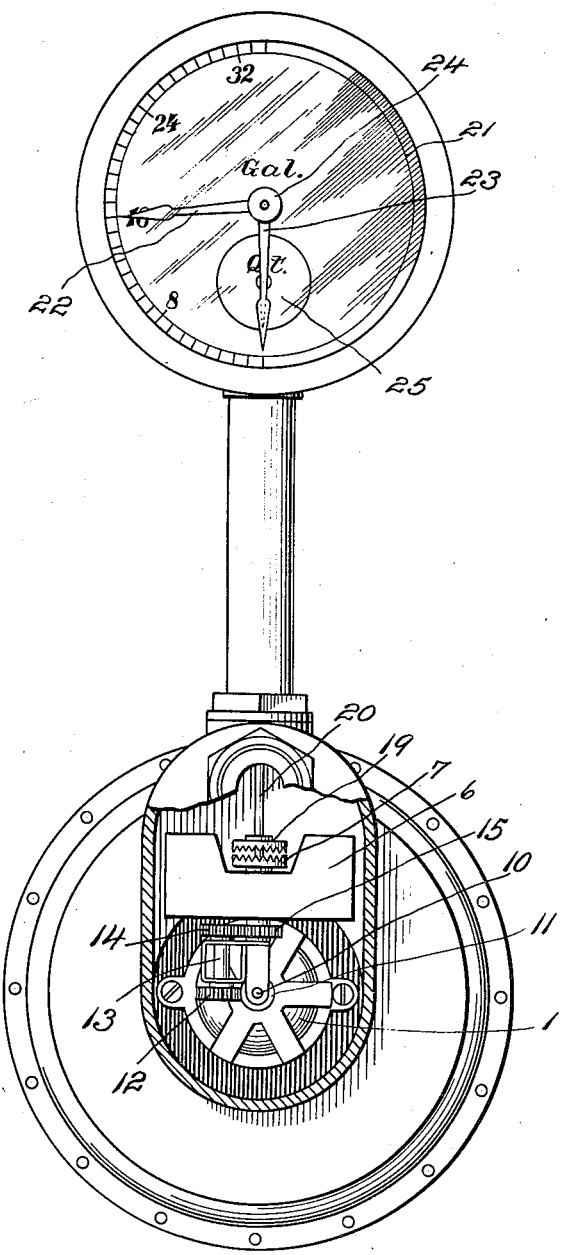

W. J. COSTELLO.
METER.
APPLICATION FILED OCT. 5, 1910.

1,189,348. Patented July 4, 1916.
2 SHEETS—SHEET 1.

Witnesses
T. P. Britt
E. C. Duffy

Inventor
Walter J. Costello
By
Attorneys

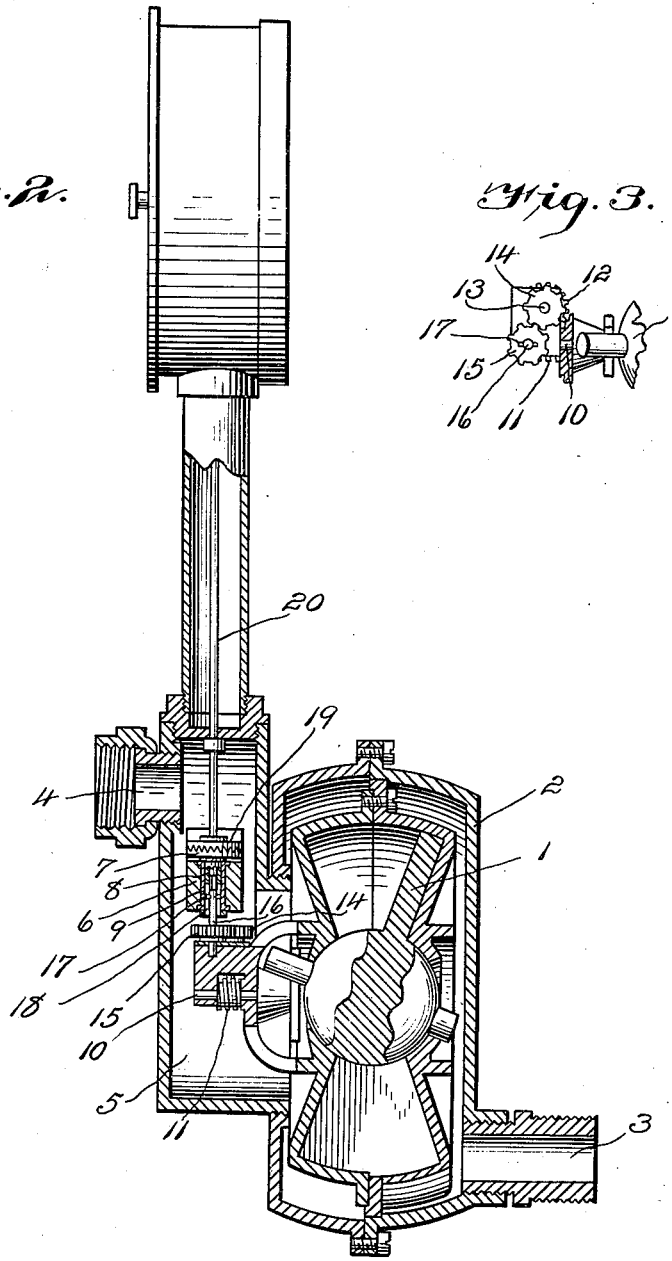

UNITED STATES PATENT OFFICE.

WALTER J. COSTELLO, OF WASHINGTON, DISTRICT OF COLUMBIA.

METER.

1,189,348.   Specification of Letters Patent.   Patented July 4, 1916.

Application filed October 5, 1910. Serial No. 585,528.

*To all whom it may concern:*

Be it known that I, WALTER J. COSTELLO, a citizen of the United States, residing at Washington, District of Columbia, have invented certain new and useful Improvements in Meters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to measuring devices, but more particularly to meters for measuring liquids, and it has for its object to provide a device of this class to be used for measuring the flow of a liquid through the meter, and which is so constructed that air or gas passing through the meter will not be registered by the meter registering dial.

Meters as usually employed for measuring liquids can be operated by air or gas forced through the meter and caused to register much the same as though liquid had passed through the same. For certain purposes therefore, when the liquid to be measured is under pressure of air or gas, meters of the general type are liable to register when the air or gas passes through the meter and to such an extent that the meter or more properly the registering dial or dials would falsely register the quantity of liquid passing through the same.

This invention therefore has for its object to provide a meter having a registering apparatus associated therewith which will only record or register when a liquid is passing through the same.

With this object in view the invention consists in the novel construction of the meter and in a means for automatically disconnecting the registering apparatus from the moving part or parts of the meter when there is no liquid within the meter.

The invention further consists in an arrangement of parts which causes air or gas to pass without affecting the registering apparatus.

The invention also consists in certain other novel details of construction and in combination of parts, all of which will be first fully described and afterward specifically pointed out in the appended claims.

In handling certain liquids usually contained in casks and drawn therefrom through faucets connected to the casks, which liquids in the casks are under air pressure certain disadvantages are presented in the measurements of said liquids by meters for the reason that meters of usual construction will register the passage of the air in the casks passing through the meter thus falsely registering the amount of liquid drawn through the meter or falsely registering the total amount of liquid in the cask. It is for the purpose of obviating these disadvantages that I have made this present invention which is so constructed and arranged that the meter will only register the amount of liquid passing through the meter or contained in the cask, while the air or other rare fluids such as gases within the cask and passing through the meter will not be registered thereby in such manner that a correct registering of the liquid in the cask will be effected.

Referring to the accompanying drawings: Figure 1 is an elevation of a meter constructed in accordance with this invention, a portion of the casing being shown in section. Fig. 2 is a vertical transverse sectional view through the meter, and Fig. 3 is a detail view of the gearing.

Like numerals of reference indicate the same parts throughout the three figures in which;

1 indicates the moving part of a meter which may be of any design or construction, it being clearly understood that the form or construction of the moving mechanism of the meter forms no part of this invention, the construction shown in the drawings and designated by the numeral 1 being employed in this application simply to illustrate the invention, and any other form of moving mechanism can be equally well employed so long as it imparts a rotary motion to the mechanism which will be now described and in which this invention resides.

2 indicates the shell containing the moving mechanism 1, while 3 and 4 indicate the intake and outlet ports respectively.

5 is a chamber through which the liquid passes on its way to the outlet port 4, and within this chamber 5 is a float 6 of cork or any other suitable material. Mounted on the said float and rotatable thereon is a clutch member 7, the sleeve 8 of which is journaled in a bearing 9 in the float 6 in such manner that said clutch member 7 and sleeve 8 are rotatable relatively to the float 6 but are vertically movable therewith.

In the embodiment shown in the drawing, 10 indicates a shaft driven by the moving mechanism 1 of the meter, said shaft carrying a worm gear 11 which meshes with a worm gear wheel 12 on a shaft 13, a small spur gear 14 being mounted on the upper end of the shaft 13, and in mesh with a similar spur gear 15 on a vertical shaft 16, said vertical shaft 16 entering the sleeve 8 of the clutch member 7, a connection being effected between said vertical shaft 16 and sleeve 8 by means of a pin 17 in the shaft 16 operating in slots 18 in the sleeve 8 in such manner that the sleeve 8 is slidable vertically on the shaft 16 but rotatable therewith.

19 indicates the upper clutch member mounted on the vertical shaft 20, which shaft drives the registering mechanism having the registering dial 21, the lower end of the shaft 20 entering the sleeve 8 of the lower clutch member 7 as shown in Fig. 2 to effect an alinement of the two shafts and clutch members.

Having thus described the mechanism shown in the drawings which form one embodiment of the invention its operation is as follows: The liquid entering the intake port 3 passes to the moving part or parts 1 of the meter and rotates the same, thus driving the shaft 10 which through the medium of the intermediate mechanism rotates the lower clutch member 7 mounted on the float 6. As the liquid passes to the chamber 5 containing the float 6 and rises therein, the float rises with the liquid and the lower clutch member 7 is carried up into engagement with the upper clutch member 19 in the position shown in Fig. 2, thus locking the lower driven shaft 16 with the dial driving shaft 20 in such manner that the rotations or movements of the meter mechanism 1 is communicated to the dial mechanism to register the amount of liquid passing through the meter. Should however any air or gas enter the meter the liquid in the float chamber 5 will fall which will cause the float 6 to drop into position shown in Fig. 1 carrying with it the lower clutch member 7 and disengaging it from the upper clutch member, which instantly breaks the connection between the dial driving shaft 20 and the moving mechanism of the meter to such an extent that any further movement of the meter mechanism will not be registered on the dial.

In applying this device for measuring liquids which are at times frothy or foamy the froth or foam passing through the meter will not be registered by the dial, nor will any movement of the meter mechanism be communicated to the dial until the solid liquid reaches the chamber 5 to raise the float 6.

As will appear from Fig. 1 the registering dial 21 is provided with a dial hand 23 which passes over the dial and indicates the amount of liquid which has passed through the meter. As soon as liquid ceases to pass therethrough the dial hand 23 will by gravity drop back to its first or zero position. In order, however, to provide a register so as to determine the highest point the meter hand 23 reaches before dropping back to its zero position a following dial hand 22 is provided, which hand can be operated from the outside of the dial. As the meter hand 23 passes up over the dial it carries the following hand 22 with it but when the meter hand 23 drops back to its zero position the following hand 22 maintains the highest position reached by the meter hand 23 in such manner that the amount of liquid which has passed through the meter can be determined even though the meter hand 23 has dropped back to its zero position. When the amount of liquid which has passed through the meter has been indicated by means of the following hand 22 said following hand 22 is turned back to zero position as shown in Fig. 1 which turning position is accomplished by means of a knurled thumb nut 24. This arrangement of the following hand and the meter hand is not new in this application and is an expedient which is old and well known in gages of different characters, particularly in pressure gages; consequently applicant lays no claim whatever to this particular construction. In connection with the large dial 21 which may be marked to register gallons a smaller dial 25 can be employed for registering quarts or for any other quantity desired, depending upon the purpose for which the device is being used.

Having thus fully described the invention what I claim as new and desire to secure by Letters Patent of the United States is:—

1. A meter provided with a suitable moving mechanism, registering mechanism, and means for automatically connecting the moving mechanism of the meter with the registering mechanism to register by the registering mechanism the movement of the moving mechanism upon passage of a dense fluid such as a liquid, through the meter, said means being constructed to automatically effect disconnection upon replacement of said liquid by air or gas.

2. A meter comprising a suitable moving mechanism arranged and adapted to be moved by the passage of a fluid through the meter, a registering mechanism, a float within the meter adapted to be raised by the liquid passing therethrough, and means including a member operated by said float to connect the moving mechanism of the meter with the registering mechanism, said member being constructed to effect disconnection automatically upon replacement of such liquid by air or gas.

3. A meter comprising suitable moving mechanism arranged and adapted to be moved by the passage of a fluid through the meter, a registering mechanism, a float adapted to be raised by liquid passing through the meter, a clutch, one of the members of which is operated by said float to connect the moving mechanism of the meter with the registering mechanism, said member being constructed to effect disconnection automatically upon replacement of such liquid by a rare fluid.

4. A meter of the type described including a moving mechanism and registering mechanism, said moving mechanism comprising a float, clutch members, one of which members is operated by said float, the other clutch member controlling said registering mechanism, intergeared members, a shaft controlled thereby which connects said moving mechanism with said registering mechanism, said shaft having a slidable connection with the float actuated clutch member, said intergeared members being controlled by an element of the meter.

5. A meter of the type described including a moving mechanism, and a registering mechanism, said moving mechanism comprising a float, clutch members, one of which members is operated by said float, the other clutch member controlling said registering mechanism, intergeared members, a shaft connecting the moving mechanism with the registering mechanism, said shaft being actuated by said intergeared members, a tubular member carried by said float, said shaft having a pin and slot connection with said tubular member, said intergeared member being controlled by an element of the meter.

6. In a liquid meter, the combination of a rotary piston rotatable by the passage of the liquid through the meter, registering mechanism, means operatively connecting the registering mechanism and the said piston, and means dependent upon the amount of liquid in the meter for disconnecting said registering mechanism and the said piston to render the mechanism inactive.

7. In a liquid meter, the combination of a rotary piston rotatable by the passage of liquid through the meter, registering mechanism, means adapted to operatively connect the registering mechanism and the said piston, and means governed by the liquid in the meter for automatically controlling said connecting means, to render the mechanism inactive or active according to the height of such liquid.

8. In a liquid meter, the combination of a rotary piston rotatable by the passage of the liquid through the meter, registering mechanism, means operatively connecting the piston and the registering mechanism, and means controlled by the height of liquid in the meter for automatically disconnecting the piston and the registering mechanism to render the latter inactive, when the liquid attains a certain level.

9. In a liquid meter, the combination of a rotary piston rotatable by the passage of the liquid through the meter, registering mechanism, means operatively connecting the piston with the registering mechanism, and a float controlled by the liquid for automatically disconnecting the piston and the registering mechanism when the liquid attains a certain level.

10. In a liquid meter, the combination of a casing, a rotatable element therein, said element being rotatable by the passage of the liquid through the casing, a register, means connecting the rotary element with the register for operating the latter, a float within the casing, and means operatively related to the float and the said connecting means to cause the latter to disconnect and connect the rotary element and the register.

11. In a liquid meter, the combination of a rotary piston, a register, a connection between the piston and the register for operating the latter, said connection including as a component part a shiftable element to render the register active or inactive, and a float controlled by the supply of liquid and operatively connected with the said shiftable element for automatically shifting the latter.

In testimony whereof, I affix my signature, in presence of two witnesses.

WALTER J. COSTELLO.

Witnesses:
JOHN L. FLETCHER,
A. B. NICHOLS.